United States Patent
C et al.

(10) Patent No.: US 12,555,293 B2
(45) Date of Patent: Feb. 17, 2026

(54) SYSTEM AND METHOD FOR SCAN TIME REDUCTION FOR PROPELLER MAGNETIC RESONANCE IMAGING ACQUISITION USING DEEP LEARNING RECONSTRUCTION

(71) Applicant: GE Precision Healthcare LLC, Waukesha, WI (US)

(72) Inventors: Florintina C, Bangalore (IN); Sudhanya Chatterjee, Bangalore (IN); Rohan Patil, Bangalore (IN); Suresh Emmanuel Devadoss Joel, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 264 days.

(21) Appl. No.: 18/506,457

(22) Filed: Nov. 10, 2023

(65) Prior Publication Data
US 2025/0157098 A1    May 15, 2025

(51) Int. Cl.
| | |
|---|---|
| *G06T 11/00* | (2026.01) |
| *G01R 33/48* | (2006.01) |
| *G01R 33/56* | (2006.01) |

(52) U.S. Cl.
CPC ........ *G06T 11/006* (2013.01); *G01R 33/4824* (2013.01); *G01R 33/5608* (2013.01); *G06T 2210/41* (2013.01); *G06T 2211/441* (2023.08)

(58) Field of Classification Search
CPC .............. G06T 11/006; G06T 2210/41; G06T 2211/441; G01R 33/4824; G01R 33/5608
See application file for complete search history.

(56) References Cited

U.S. PATENT DOCUMENTS

| | | | |
|---|---|---|---|
| 10,806,370 B1 * | 10/2020 | Brada | ........................ G06T 5/50 |
| 2009/0129648 A1 | 5/2009 | Arfanakis et al. | |

(Continued)

FOREIGN PATENT DOCUMENTS

| | | |
|---|---|---|
| CN | 110942496 | 3/2020 |
| CN | 114021485 | 2/2022 |
| CN | 114419176 | 4/2022 |

OTHER PUBLICATIONS

Norbeck et al., "Simultaneous Multi-Slice Combined With Propeller," Magnetic Resonance in Medicine, 2018, 11 pgs.

(Continued)

*Primary Examiner* — John R Wallace
(74) *Attorney, Agent, or Firm* — Fletcher Yoder, P.C.

(57) ABSTRACT

A system and method for reducing scan time of periodically rotated overlapping parallel lines with enhanced reconstruction (PROPELLER) imaging include acquiring a plurality of blades of k-space data of a region of interest in a rotational manner around a center of k-space via a magnetic resonance imaging (MRI) scanner during a PROPELLER sequence, wherein each blade of the plurality of blades of k-space data includes a plurality of parallel phase encoding lines sampled in a phase encoding order. Each blade of the plurality of blades of k-space data is undersampled. The system and method include utilizing a deep learning-based Cartesian-like reconstruction network to individually and separately reconstruct each blade of the plurality of blades of k-space data to generate a plurality of fully sampled blades. The system and method include utilizing a PROPELLER reconstruction algorithm to generate a complex image from the plurality of fully sampled blades.

20 Claims, 11 Drawing Sheets

(56) References Cited

U.S. PATENT DOCUMENTS

2020/0033431 A1* 1/2020 Schlemper ............ G06V 10/454
2021/0124003 A1* 4/2021 Lazarus ................ G06T 11/006
2023/0184861 A1   6/2023 Nickel
2025/0157098 A1* 5/2025 C ........................ G01R 33/5611

OTHER PUBLICATIONS

Ravishankar et al., "MR Image Reconstruction From Highly Undersampled k-Space Data by Dictionary Learning," IEEE Transactions on Medical Imaging, vol. 30, No. 5, May 2011, 14 pgs.
Schlemper et al., "Nonuniform Variational Network: Deep Learning for Accelerated Nonuniform MR Image Reconstruction," Medical Image Computing and Computer Assisted Intervention, 2019, 9 pgs.
Lyu et al., "A New Joint-Blade Sense Reconstruction for Accelerated Propeller MRI," Scientific Reports, Feb. 16, 2017, 15 pgs.
Shimron et al., "Bladenet: Rapid Propeller Acquisition Reconstruction for High spatio-temporal Resolution Abdominal MRI," Proc. Intl. Mag. Reason. Med. 30, 2022, 3 pgs.
Yarach et al., "Accelerated Propeller FSE-DWI with Unrolled Deep Learning Reconstruction at 1.5T Clinical MRI."

* cited by examiner

SYSTEM AND METHOD FOR SCAN TIME REDUCTION FOR PROPELLER MAGNETIC RESONANCE IMAGING ACQUISITION USING DEEP LEARNING RECONSTRUCTION

BACKGROUND

The subject matter disclosed herein relates to medical imaging and, more particularly, to a system and a method for scan time reduction for PROPELLER magnetic resonance imaging acquisition using deep learning reconstruction.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During magnetic resonance imaging (MRI), when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

Cartesian acquisition is the most widely used technique for k-space acquisition. However, there are several techniques in which k-space data is acquired on a non-Cartesian grid. Periodically rotated overlapping parallel lines with enhanced reconstruction (PROPELLER) can be considered as a mix of Cartesian and non-Cartesian. PROPELLER is an MR technique which provides high resolution magnetic resonance imaging with reduced motion artifacts by providing the capability to remove motion affected blades and by oversampling the low spatial frequencies. A PROPELLER scan is a critical scan at clinical sites, especially for anatomies which are at risk of being affected by motion such as the abdomen, the pelvis, and the cervical spine. However, PROPELLER scans have a higher scan time than Cartesian techniques.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, computer-implemented method for reducing scan time of periodically rotated overlapping parallel lines with enhanced reconstruction (PROPELLER) imaging is provided. The computer-implemented method includes acquiring, via a processor, in an accelerated manner a plurality of blades of k-space data of a region of interest in a rotational manner around a center of k-space via a magnetic resonance imaging (MRI) scanner during a PROPELLER sequence, wherein each blade of the plurality of blades of k-space data includes a plurality of parallel phase encoding lines sampled in a phase encoding order. Each blade of the plurality of blades of k-space data is undersampled. The computer-implemented method also includes utilizing, via the processor, a deep learning-based Cartesian-like reconstruction network to individually and separately reconstruct each blade of the plurality of blades of k-space data to generate a plurality of fully sampled blades. The computer-implemented method further includes utilizing, via the processor, a PROPELLER reconstruction algorithm to generate a complex image from the plurality of fully sampled blades.

In another embodiment, a system for reducing scan time of periodically rotated overlapping parallel lines with enhanced reconstruction (PROPELLER) imaging is provided. The system includes a memory encoding processor-executable routines. The system also includes a processor configured to access the memory and to execute the processor-executable routines, wherein the routines, when executed by the processor, cause the processor to perform actions. The actions include acquiring, in an accelerated manner, a plurality of blades of k-space data of a region of interest in a rotational manner around a center of k-space via a magnetic resonance imaging (MRI) scanner during a PROPELLER sequence, wherein each blade of the plurality of blades of k-space data includes a plurality of parallel phase encoding lines sampled in a phase encoding order. Each blade of the plurality of blades of k-space data is undersampled. The actions also include utilizing a deep learning-based Cartesian-like reconstruction network to individually and separately reconstruct each blade of the plurality of blades of k-space data to generate a plurality of fully sampled blades. The actions further include utilizing a PROPELLER reconstruction algorithm to generate a complex image from the plurality of fully sampled blades.

In a further embodiment, a non-transitory computer-readable medium, the non-transitory computer-readable medium including processor-executable code that when executed by a processor, causes the processor to perform actions. The actions include acquiring, in an accelerated manner, a plurality of blades of k-space data of a region of interest in a rotational manner around a center of k-space via a magnetic resonance imaging (MRI) scanner during a PROPELLER sequence, wherein each blade of the plurality of blades of k-space data includes a plurality of parallel phase encoding lines sampled in a phase encoding order. Each blade of the plurality of blades of k-space data is undersampled. The actions also include utilizing a deep learning-based Cartesian-like reconstruction network to individually and separately reconstruct each blade of the plurality of blades of k-space data to generate a plurality of fully sampled blades. The actions further include utilizing a PROPELLER reconstruction algorithm to generate a complex image from the plurality of fully sampled blades.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
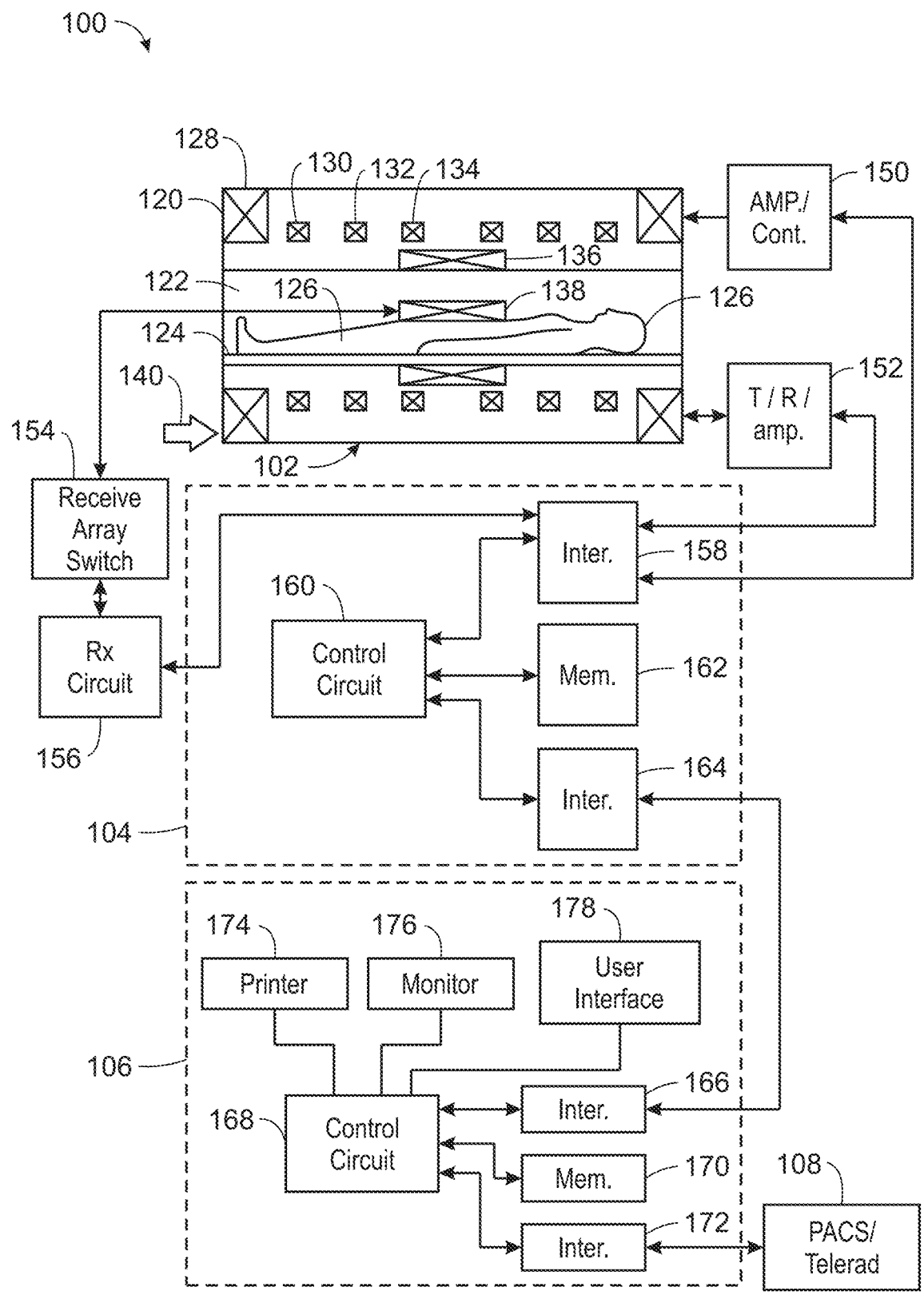
FIG. 1 illustrates an embodiment of a magnetic resonance imaging (MRI) system suitable for use with the disclosed technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as image reconstruction for non-destructive inspection of manufactured parts or goods (i.e., quality control or quality review applications), and/or the non-invasive inspection of packages, boxes, luggage, and so forth (i.e., security or screening applications). In general, the disclosed techniques may be useful in any imaging or screening context or image processing or photography field where a set or type of acquired data undergoes a reconstruction process to generate an image or volume.

Deep learning (DL) approaches discussed herein may be based on artificial neural networks, and may therefore encompass one or more of deep neural networks, fully connected networks, convolutional neural networks (CNNs), unrolled neural networks, perceptrons, encoders-decoders, recurrent networks, transformer networks, wavelet filter banks, u-nets, general adversarial networks (GANs), dense neural networks (e.g., residual dense networks (RDNs), or other neural network architectures. The neural networks may include shortcuts, activations, batch-normalization layers, and/or other features. These techniques are referred to herein as DL techniques, though this terminology may also be used specifically in reference to the use of deep neural networks, which is a neural network having a plurality of layers.

As discussed herein, DL techniques (which may also be known as deep machine learning, hierarchical learning, or deep structured learning) are a branch of machine learning techniques that employ mathematical representations of data and artificial neural networks for learning and processing such representations. By way of example, DL approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

The present disclosure provides systems and methods for reducing scan time of periodically rotated overlapping parallel lines with enhanced reconstruction (PROPELLER) imaging. Periodically rotated overlapping parallel lines with enhanced reconstruction is an MR technique which provides high resolution magnetic resonance imaging with reduced motion artifacts by providing the capability to remove motion affected blades and by oversampling the low spatial frequencies. In periodically rotated overlapping parallel lines with enhanced reconstruction, overlapping blades are acquired rotated around the k-space.

The disclosed systems and methods include acquiring, in an accelerated manner, a plurality of blades of k-space data of a region of interest in a rotational manner around a center of k-space via a magnetic resonance imaging (MRI) scanner during a periodically rotated overlapping parallel lines with enhanced reconstruction (PROPELLER) sequence, wherein each blade of the plurality of blades of k-space data includes a plurality of parallel phase encoding lines sampled in a phase encoding order. Each blade of the plurality of blades of k-space data is undersampled (e.g., having fewer phase encoding lines relative to a fully sampled blade). In certain embodiments, the plurality of blades of k-space data may be sampled in a uniform manner. In certain embodiments, the plurality of blades of k-space data may be sampled in a non-uniform manner. The disclosed systems and methods also include utilizing a deep learning-based Cartesian-like reconstruction network to individually and separately reconstruct each blade of the plurality of blades of k-space data to generate a plurality of fully sampled blades. The disclosed systems and methods further include utilizing a PROPELLER reconstruction algorithm to generate a complex image from the plurality of fully sampled blades.

In certain embodiments, the deep learning-based Cartesian-like reconstruction network is configured to perform with an arbitrary number of blades of k-space data. In certain embodiments, the plurality of blades of k-space data is acquired from a single receiver coil. In certain embodiments, wherein the plurality of blades of k-space data is acquired from a plurality of receiver coils. In certain embodiments, the plurality of blades of k-space data includes skewed aspect ratios.

In certain embodiments, the deep learning-based Cartesian-like reconstruction network includes an unrolled algorithm-based deep learning-based network. In certain embodiments, the disclosed systems and method train the deep learning-based Cartesian-like reconstruction network on input-output data pairs utilizing supervised learning. The input-output data pairs include undersampled k-space blade images and corresponding fully sampled k-space images acquired utilizing the periodically rotated overlapping parallel lines with enhanced reconstruction sequence. The undersampled k-space blade images were generated from the corresponding fully sampled k-space images.

In certain embodiments, a non-transitory computer-readable medium, the non-transitory computer-readable medium includes processor-executable code that when executed by a processor, causes the processor to perform actions. The actions include acquiring, in an accelerated manner, a plurality of blades of k-space data of a region of interest in a rotational manner around a center of k-space via a magnetic resonance imaging (MRI) scanner during a PROPELLER sequence, wherein each blade of the plurality of blades of k-space data includes a plurality of parallel phase encoding lines sampled in a phase encoding order. Each blade of the plurality of blades of k-space data is undersampled (e.g., having fewer phase encoding lines relative to a fully sampled blade). The actions also include utilizing a deep learning-based Cartesian-like reconstruction network to individually and separately reconstruct each blade of the plurality of blades of k-space data to generate a plurality of fully sampled blades. The actions further include utilizing a PROPELLER reconstruction algorithm to generate a complex image from the plurality of fully sampled blades.

The disclosed embodiments provide a technique that utilizes a Cartesian-like reconstruction approach at blade level for accelerated periodically rotated overlapping parallel lines with enhanced reconstruction (PROPELLER) acquisitions, while maintaining all of the remaining elements of the PROPELLER image reconstruction undisturbed in the reconstruction chain. The disclosed embodiments enable faster magnetic resonance imaging scans utilizing the periodically rotated overlapping parallel lines with enhanced reconstruction scans. The disclosed embodiments also increases the system throughput for the use of the magnetic resonance imaging system. The disclosed embodiments may also be utilized with both Cartesian and PROPELLER undersampled reconstruction.

With the preceding in mind, FIG. 1 a magnetic resonance imaging (MRI) system 100 is illustrated schematically as including a scanner 102, scanner control circuitry 104, and system control circuitry 106. According to the embodiments described herein, the magnetic resonance imaging system 100 is generally configured to perform magnetic resonance imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the magnetic resonance imaging system 100 may include any suitable scanner or detector, in the illustrated embodiment, the system 100 includes a full body scanner 102 having a housing 120 through which a bore 122 is formed. A table 124 is moveable into the bore 122 to permit a patient 126 (e.g., subject) to be positioned therein for imaging selected anatomy within the patient.

Scanner 102 includes a series of associated coils for producing controlled magnetic fields for exciting the gyromagnetic material within the anatomy of the patient being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., RF transmit coil) is configured to generate radio frequency pulses for exciting the certain gyromagnetic nuclei within the patient. In addition to the coils that may be local to the scanner 102, the system 100 also includes a set of receiving coils or RF receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak RF signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, $B_0$. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the RF coil 136. Circuit 152 includes a switching device for alternating between the active and inactive modes of operation, wherein the RF coil 136 transmits and does not transmit signals, respectively. Circuit 152 also includes amplification circuitry configured to generate the RF pulses. Similarly, the receiving coils 138 are connected to switch 154, which is capable of switching the receiving coils 138 between receiving and non-receiving modes. Thus, the receiving coils 138 resonate with the RF signals produced by relaxing gyromagnetic nuclei from within the patient 126 while in the receiving mode, and they do not resonate with RF energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the RF coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106. In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the magnetic resonance imaging system 100 and to store the processed image data for later reconstruction, display and transmission. The programming code may execute one or more algorithms that, when executed by a processor, are configured to perform reconstruction of acquired data as described below. In certain embodiments, the memory circuit 170 may store one or more neural networks for processing and/or reconstruction of acquired data (e.g., deep learning-based Cartesian-like reconstruction network) as described below. In certain embodiments, image reconstruction may occur on a separate computing device having processing circuitry and memory circuitry.

A processing component (e.g., a microprocessor or processing circuitry) and a memory of the magnetic resonance imaging system 100, such as may be present in scanner control circuitry 104 and/or system control circuitry 106, may be used to execute stored software code, instructions, or routines for acquiring and processing the MR data. The term "code" or "software code" used herein refers to any instructions or set of instructions that control the magnetic resonance imaging system 100. The code or software code may exist in a computer-executable form, such as machine code, which is the set of instructions and data directly executed by the processing component of the scanner control circuitry 104 and/or system control circuitry 106, human-understandable form, such as source code, which may be compiled in order to be executed by the processing component of the scanner control circuitry 104 and/or system control circuitry 106, or an intermediate form, such as object code, which is produced by a compiler. In some embodiments, the magnetic resonance imaging system 100 may include a plurality of controllers.

As an example, the memory may store processor-executable software code or instructions (e.g., firmware or software), which are tangibly stored on a non-transitory computer readable medium. Additionally or alternatively, the memory 46 may store data. As an example, the memory may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, processing component may include multiple microprocessors, one or more "general-purpose" microprocessors, one or more special-purpose microprocessors, and/or one or more application specific integrated circuits (ASICS), or some combination thereof. For example, the processing component may include one or more reduced instruction set (RISC) or complex instruction set (CISC) processors. The processing component may include multiple processors, and/or the memory may include multiple memory devices.

The processing component is configured to acquire, in an accelerated manner, a plurality of blades of k-space data of a region of interest in a rotational manner around a center of k-space via a magnetic resonance imaging (MRI) scanner during a periodically rotated overlapping parallel lines with enhanced reconstruction (PROPELLER) sequence, wherein each blade of the plurality of blades of k-space data includes a plurality of parallel phase encoding lines sampled in a phase encoding order. Each blade of the plurality of blades of k-space data is undersampled (e.g., having fewer phase encoding lines relative to a fully sampled blade). In certain embodiments, the plurality of blades of k-space data may be sampled in a uniform manner. In certain embodiments, the plurality of blades of k-space data may be sampled in a non-uniform manner. The processing component is also configured to utilize a deep learning-based Cartesian-like reconstruction network to individually and separately reconstruct each blade of the plurality of blades of k-space data to generate a plurality of fully sampled blades. The processing component is further configured to utilize a PROPELLER reconstruction algorithm to generate a complex image from the plurality of fully sampled blades.

In certain embodiments, the deep learning-based Cartesian-like reconstruction network is configured to perform with an arbitrary number of blades of k-space data. In certain embodiments, the plurality of blades of k-space data is acquired from a single receiver coil. In certain embodiments, wherein the plurality of blades of k-space data is acquired from a plurality of receiver coils. In certain embodiments, the plurality of blades of k-space data includes skewed aspect ratios.

In certain embodiments, the deep learning-based Cartesian-like reconstruction network includes an unrolled algorithm-based deep learning-based network. In certain embodiments, the processing component is configured to train the deep learning-based Cartesian-like reconstruction network on input-output data pairs utilizing supervised learning. The input-output data pairs include undersampled k-space blade images (e.g., having fewer phase encoding lines relative to a fully sampled blade) and corresponding fully sampled k-space images acquired utilizing the periodically rotated overlapping parallel lines with enhanced reconstruction sequence. The undersampled k-space blade images were generated from the corresponding fully sampled k-space images.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
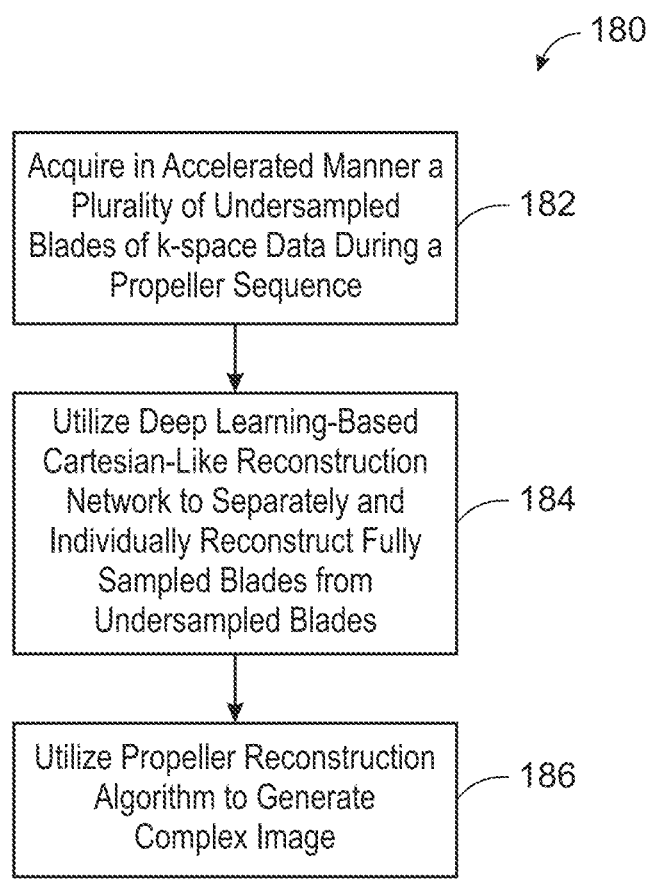
FIG. 2 illustrates a flow chart of a method for reducing scan time of periodically rotated overlapping parallel lines with enhanced reconstruction (PROPELLER) imaging, in accordance with aspects of the present disclosure.

FIG. 2 is a flow chart of a method 180 for reducing scan time of periodically rotated overlapping parallel lines with enhanced reconstruction (PROPELLER) imaging. One or more steps of the method 180 may be performed by processing circuitry of the magnetic resonance imaging system 100 in FIG. 1 or a remote computing system. For example, the processing circuitry may part of the scanner control circuitry 104 and/or system control circuitry 106 of the magnetic resonance imaging system 100. One or more steps of the method 180 may be performed simultaneously and/or in a different order shown in FIG. 2. The method 180 is performed on data acquired from a single receiver coil (e.g., radio frequency receiving coil) or a plurality of receiver coils (e.g., radio frequency receiving body coil or radio frequency receiving surface coil). The method 180 is agnostic to the number of blades in the PROPELLER image. Thus, there is no restriction on the number of blades in the PROPELLER image and the method 180 can be utilized with an arbitrary number of blades. The method 180 is performed in the image space.

The method 180 includes acquiring, in accelerated manner, a plurality of blades of k-space data of a region of interest in a rotational manner (e.g., rotated approximately 10 to 20 degrees between blade acquisitions) around a center of k-space via a magnetic resonance imaging scanner (e.g., magnetic resonance imaging scanner 102 in FIG. 1) during a periodically rotated overlapping parallel lines with enhanced reconstruction sequence (block 182). Each blade of the plurality of blades of k-space data includes a plurality of parallel phase encoding lines sampled in a phase encoding order (e.g., having a rectilinear shape) using fast spin echo or gradient echo methods (i.e., each blade is filled by an echo train of a respective MR pulse sequence). Each blade of the plurality of blades of k-space is undersampled. In particular, fewer phase encoding lines are acquired for each blade of the plurality of blades of k-space data. In certain embodiments, the plurality blades of k-space data are undersampled in a uniform manner. In certain embodiments, the plurality of blades of k-space data are undersampled in a non-uniform manner. The plurality of undersampled blades of k-space data have skewed aspect ratios. Each blade is acquired in a true Cartesian manner.

The method 180 also includes utilizing a deep learning-based Cartesian-like reconstruction network to individually and separately reconstruct each blade of the plurality of blades of k-space data to generate a plurality of fully sampled blades (block 184). The deep learning-based Cartesian-like reconstruction network is trained to reconstruct fully sampled k-space blade images from undersampled k-space blade images. The training of the deep learning-based Cartesian-like reconstruction network is described below in FIG. 4. The deep learning-based Cartesian-like reconstruction network is configured to perform (and also trained) with an arbitrary number of blades of k-space data. The deep learning-based Cartesian-like reconstruction network includes an unrolled algorithm-based deep learning-based network.

The method 180 further includes utilizing a PROPELLER reconstruction algorithm to generate a complex image of the region of interest from the plurality of fully sampled (reconstructed) blades (block 186). For example, the PROPELLER reconstruction algorithm includes phase correction for each blade to assure its point of rotation is exactly at the center of k-space, corrections for bulk in-plane rotation and in-plane translation of the object, and correlation-weighting to minimize the data from blades containing motion or displacement errors. In certain embodiments, the complex image be further processed prior to writing the image into a Digital Imaging and Communications in Medicine (DICOM) file. It should be noted that since the Cartesian-like reconstruction is at the blade level (where the blades are also acquired in a Cartesian manner), the deep learning-based Cartesian-like reconstruction network can be utilized for Cartesian undersampled reconstruction (utilizing a different reconstruction pipeline subsequent to utilization of the network) in addition to PROPELLER undersampled reconstruction.

Figure 3:
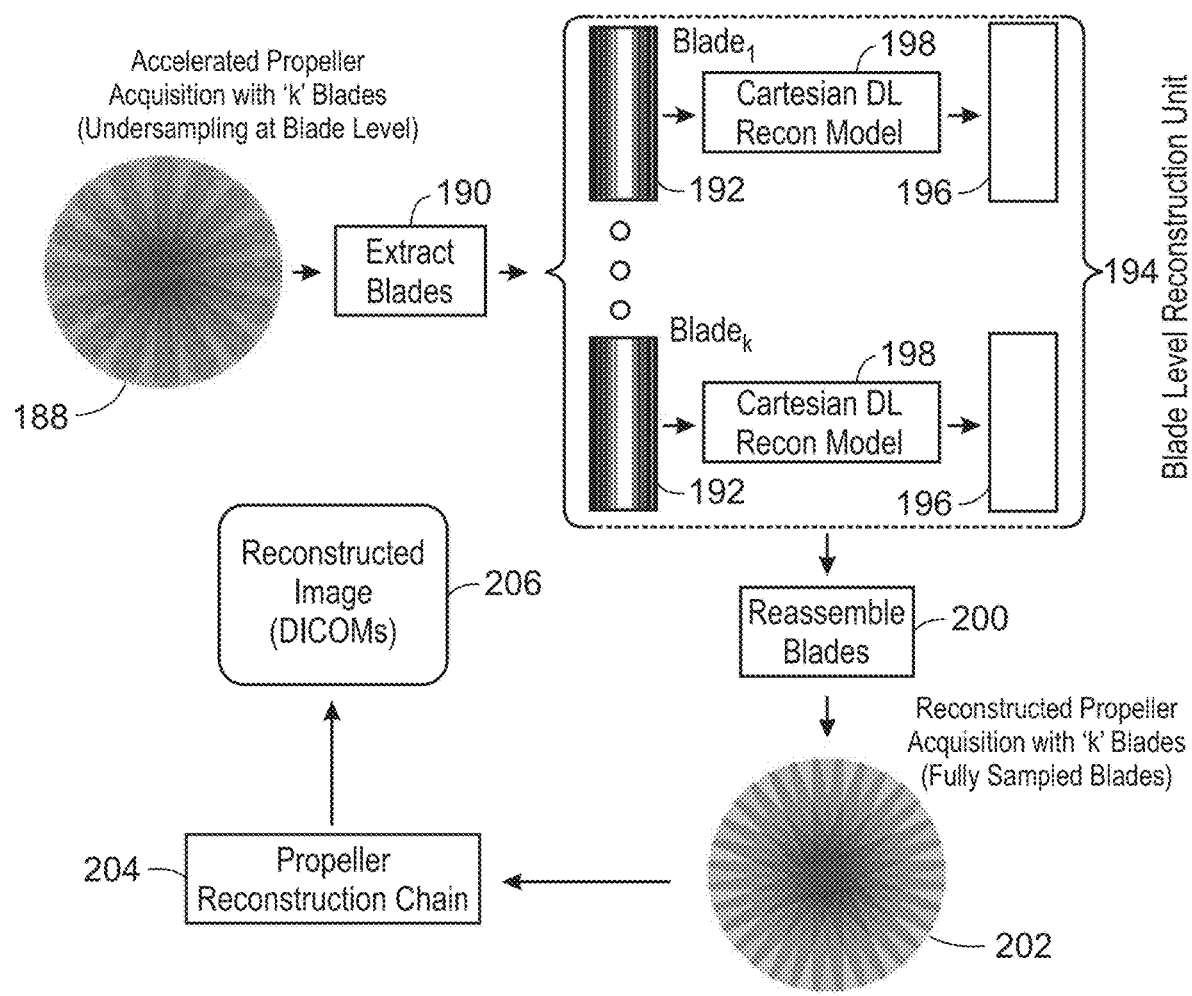
FIG. 3 is a schematic diagram of the method in FIG. 2 illustrating the method in more detail, in accordance with aspects of the present disclosure.

FIG. 3 is a schematic diagram of the method 180 in FIG. 2 illustrating the method in more detail. As depicted in FIG. 3, an accelerated periodically rotated overlapping parallel lines with enhanced reconstruction acquisition is performed with k blades of k-space data with undersampling at the blade level. Periodically rotated overlapping parallel lines with enhanced reconstruction acquisition is a mix of Cartesian and non-Cartesian acquisition. The plurality of blades of k-space data of a region of interest are acquired in a rotational manner (e.g., rotated approximately 10 to 20 degrees between blade acquisitions) around a center of k-space via a magnetic resonance imaging scanner (e.g., magnetic resonance imaging scanner 102 in FIG. 1) during a periodically rotated overlapping parallel lines with enhanced reconstruction sequence. The blades in the PROPELLER space (i.e., PROPELLER image) is represented by reference numeral 188. Each blade of the plurality of blades of k-space data includes a plurality of parallel phase encoding lines sampled in a phase encoding order (e.g., having a rectilinear shape) using fast spin echo or gradient echo methods (i.e., each blade is filled by an echo train of a respective MR pulse sequence). Each blade of k-space data is acquired in a true Cartesian manner. Each blade of the plurality of blades of k-space is undersampled. In particular, fewer phase encoding lines are acquired for each blade of the plurality of blades of k-space data. In certain embodiments, the plurality blades of k-space data are undersampled in a uniform manner. In certain embodiments, the plurality of blades of k-space data are undersampled in a non-uniform manner. The plurality of undersampled blades of k-space data have skewed aspect ratios. Each blade is acquired in a true Cartesian manner.

The plurality of undersampled blades of k-space data (or undersampled blade images) are extracted from the acquired periodically rotated overlapping parallel lines with enhanced reconstruction data as indicated by reference numeral 190. Each undersampled blade of k-space data (or undersampled blade image), represented by reference numeral 192, is separately and individually inputted into a blade level reconstruction unit 194. The blade level reconstruction unit 194 outputs a reconstructed and fully sampled blade of k-space data (or fully sampled blade image), represented by reference numeral 196, for each respective undersampled blade of k-space data (or undersampled blade image) 192. In particular, the blade level reconstruction unit 194 includes a deep learning-based Cartesian-like reconstruction network 198 to individually and separately reconstruct each undersampled blade of k-space data (or undersampled blade image) 192 to generate a respective fully sampled blade of k-space data (or fully sampled blade image) 196. The process is repeated individually and separately for each undersampled blade (to blade k) as depicted in FIG. 3. The deep learning-based Cartesian-like reconstruction network 198 is trained to reconstruct fully sampled k-space blade images from undersampled k-space blade images. The training of the deep learning-based Cartesian-like reconstruction network 198 is described below in FIG. 4. The deep learning-based Cartesian-like reconstruction network 198 is configured to perform (and also trained) with an arbitrary number of blades of k-space data since the blades are reconstructed separately and individually (as opposed to being processed simultaneously as multiple channels). The deep learning-based Cartesian-like reconstruction network 198 includes an unrolled algorithm-based deep learning-based network. It should be noted that since the Cartesian-like reconstruction is at the blade level (where the blades are also acquired in a Cartesian manner), the deep learning-based Cartesian-like reconstruction network 198 can be utilized for Cartesian undersampled reconstruction (utilizing a different reconstruction pipeline subsequent to utilization of the network 198) in addition to PROPELLER undersampled reconstruction. For example, the deep learning-based Cartesian-like reconstruction network 198 may be utilized with autocalibrating reconstruction for Cartesian imaging (ARC)-like undersampling, random undersampling, variable density undersampling, or other form of undersampling.

The reconstructed fully sampled blades 196 are reassembled (as represented by reference numeral 200) to a non-Cartesian grid as represented by reference numeral 202. The reconstructed PROPELLER acquisition (with fully sampled blades) 202 (i.e., reconstructed PROPELLER image) is subject to the remaining elements of the PROPELLER reconstruction chain as indicated by reference numeral 204. In particular, a PROPELLER reconstruction algorithm is utilized to generate a complex image (reconstructed image) 206 of the region of interest from the plurality of fully sampled (reconstructed) blades. For example, the PROPELLER reconstruction algorithm includes phase correction for each blade to assure its point of rotation is exactly at the center of k-space, corrections for bulk in-plane rotation and in-plane translation of the object, and correlation-weighting to minimize the data from blades containing motion or displacement errors. In certain embodiments, the complex image 206 be further processed prior to writing the image into a Digital Imaging and Communications in Medicine (DICOM) file.

As noted above, the deep learning-based blade level reconstruction is agnostic of the number of blades present in the periodically rotated overlapping parallel lines with enhanced (PROPELLER) data. This is due to the reconstruction being performed at the acquisition space itself—one at a time. Each blade is treated exactly as Cartesian data and reconstructed accordingly. None of the blades are concatenated at any point. This makes the disclosed technique agnostic to the number of blades present-both from training the perspective and the inference data perspective. At both the training and inference phases, each blade is processed as a reconstruction separately. Likewise, the loss for backpropagation is computed for each blade separately. In addition, the proposed technique is conducted only in the image space.

Figure 4:
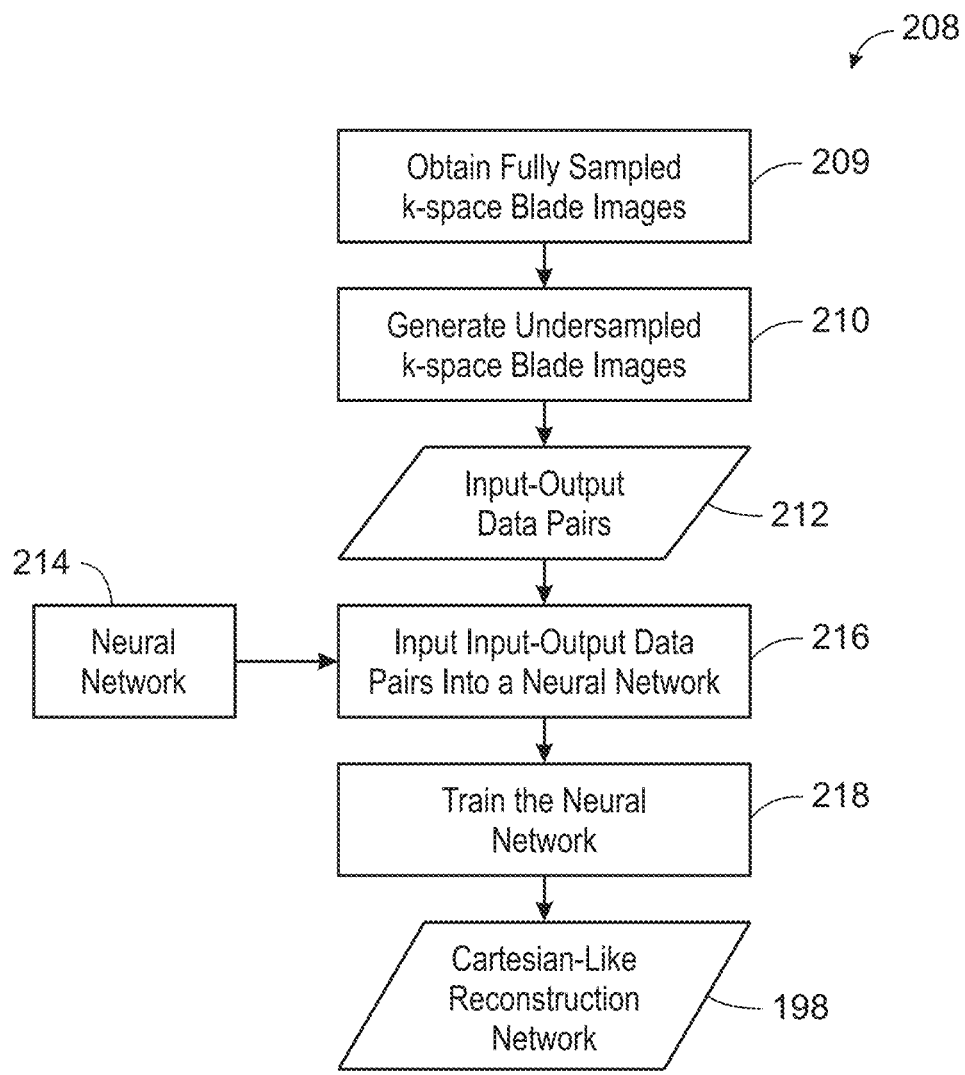
FIG. 4 illustrates a flow chart of a method for training a deep learning-based Cartesian-like reconstruction network, in accordance with aspects of the present disclosure.

FIG. 4 illustrates a flow chart of a method 208 for training a deep learning-based Cartesian-like reconstruction network (e.g., deep learning-based Cartesian-like reconstruction network 198 in FIG. 3). One or more steps of the method 208 may be performed by processing circuitry of the magnetic resonance imaging system 100 in FIG. 1 or a remote computing system. For example, the processing circuitry may part of the scanner control circuitry 104 and/or system control circuitry 106 of the magnetic resonance imaging system 100.

The method 208 includes obtaining fully sampled k-space blade images acquired utilizing a periodically rotated overlapping parallel lines with enhanced reconstruction sequence (block 209). The method 208 also includes generating partially sampled k-space blade images from the fully sampled k-space blade images (block 210). The method 208 further includes inputting input-output (e.g., labeled) data pairs 212 into a neural network 214 (block 216). The neural network 214 is an unrolled algorithm-based deep learning-based network. The input-output data pairs 212 are undersampled k-space blade images and corresponding fully sampled k-space images acquired utilizing the PROPELLER sequence. The fully sampled k-space images serve as the ground truth. The input-output data pairs 212 have skewed aspect ratios. The method 208 yet further includes training the neural network 214 on the input-output data pairs 212 utilizing supervised learning to generate the deep learning-based Cartesian-like reconstruction network or model 198 (block 218).

Figure 5:
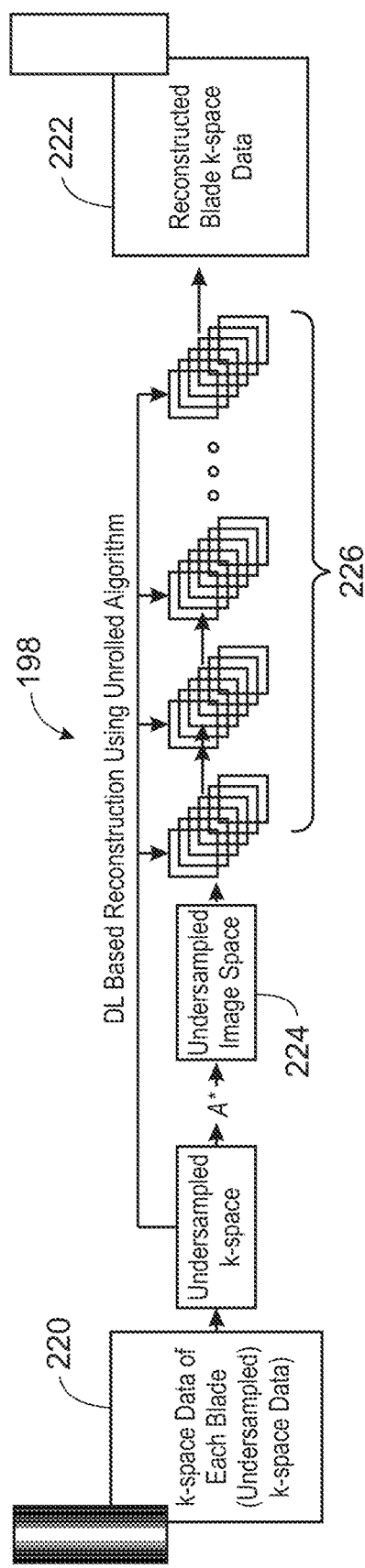
FIG. 5 illustrates a schematic diagram of a deep learning-based Cartesian-like reconstruction network and its utilization, in accordance with aspects of the present disclosure.

FIG. 5 illustrates a schematic diagram of the deep learning-based Cartesian-like reconstruction network 198 and its utilization. As depicted in FIG. 5, the deep learning-based Cartesian-like reconstruction network 198 is an unrolled algorithm-based deep learning-based network. The unrolled algorithm-based deep learning-based network is trained or learns to perform reconstruction of fully sampled k-space blades 220 (or fully sampled k-space blade images) from undersampled k-space blades 222 (or undersampled k-space blade images). Each undersampled blade is individually and separately reconstructed into a fully sampled blade via the unrolled algorithm-based deep learning-based network. The undersampled k-space data is transformed into undersampled image space 224 as depicted in FIG. 5 prior to inputting into the unrolled steps 226. The reconstruction is a Cartesian-like reconstruction. Due to the highly skewed aspect ratio of the PROPELLER blades the deep learning-based Cartesian-like reconstruction network 198 is trained with PROPELLER blade data as described in FIG. 4 to ensure effective aliasing removal and high image quality reconstruction. As noted above, since reconstruction is blade wise (as opposed to processing all blades simultaneously as multiple channels), the reconstruction described herein is not limited to PROPELLER reconstruction with a fixed number of blades but works on PROPELLER reconstruction with an arbitrary number of blades.

Loss function is utilized to train the blade-level unrolled algorithm-based deep learning-based reconstruction network 198. The loss function, $\mathcal{L}$, is shown in the following equation (Equation 1):

$$\mathcal{L}(I, \hat{I}) = \alpha \times (\|Re(I), Re(\hat{I})\|_1 + \|Im(I), Im(\hat{I})\|_1) + \beta \times SSIM(abs(I), abs(\hat{I})).$$

I represents the ground truth image, Î represents the estimated or reconstructed image, Re represents the real channel, and Im represents the imaginary channel. Also, α and β represent loss weights. These loss weights can be any floating point values. In the following disclosure, α equal 0.5 and β equals 1.0. The first portion of the equation (to the left of the second+sign) represents mean absolute error (MAE) loss on the real and imaginary channels. This ensures accurate complex reconstruction. Thus, both magnitude and phase are retained. The second portion of the equation (to the right of the second+sign) represents the structural similarity index (SSIM). The SSIM on the magnitude ensures accurate retention of structures in the reconstructed images.

The unrolling algorithm for reconstruction is described in more detail by the following equation (Equation 2):

$$\min_x \|y - Ax\|_2^2 + \lambda \|x - z\|_2^2,$$

where x represents the fully sampled blade k-space, y represents the acquired undersampled blade k-space, A represents the MRI signal formation operator such that A=M·F where M represents the undersampling mask used for the blade acquisition and F represents the Fourier operation, λ represents the regularization weight, and z is the deep learning regularizer output. The deep learning regularizer is trained to perform the task of aliasing and blurring artifact removal from the blade image due to the undersampling operation. In Equation 2, the first term is the data consistency term which is obtained from the underlying MR image formation process of the blade. The second term is the data fidelity term which obtained from the output of the deep learning regularizer. The update step for the unrolling algorithm is described by the following equation (Equation 3):

$$X_{rec}(k) = \begin{cases} Z(k) & \text{`k' is not acquired} \\ \dfrac{Z(k) + \lambda X_{acq}(k)}{1 + \lambda} & \text{`k' is acquired} \end{cases},$$

where $X_{rec}(k)$, $Z(k)$, $X_{acq}(k)$ are the k-space information at kth position of the fully reconstructed image at the end of an unrolling step, deep learning predicted image of the unroll step, and the original image as acquired, respectively. This is repeated for N number of unrolls. As utilized in the results below, N equals 10, and the deep learning regularizer is a deep learning network with residual channel attention architecture (#groups=5, #blocks=5). Also, λ is trainable.

Figure 6:
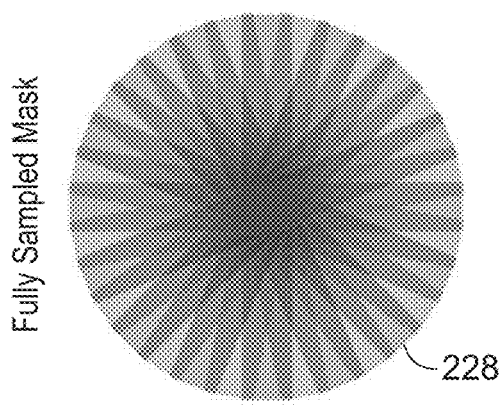
FIG. 6 illustrates an example of a mask of a fully sampled mask of a periodically rotated overlapping parallel lines with enhanced reconstruction (PROPELLER) acquisition, in accordance with aspects of the present disclosure.
Figure 7:
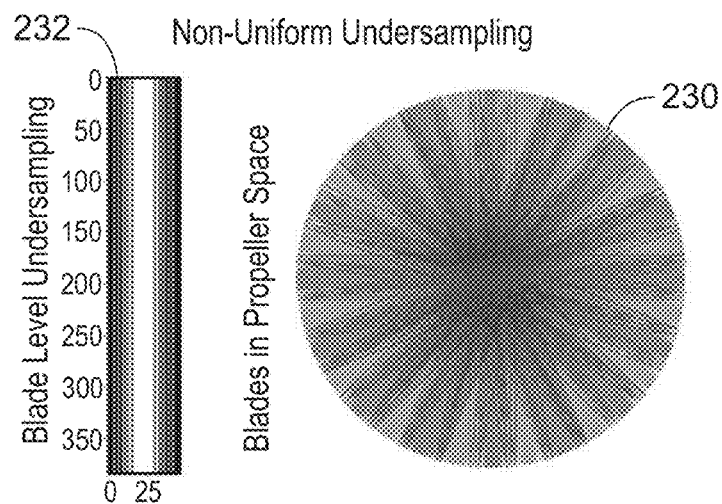
FIG. 7 illustrates an example of non-uniform undersampling a periodically rotated overlapping parallel lines with enhanced reconstruction (PROPELLER) acquisition, in accordance with aspects of the present disclosure.
Figure 8:
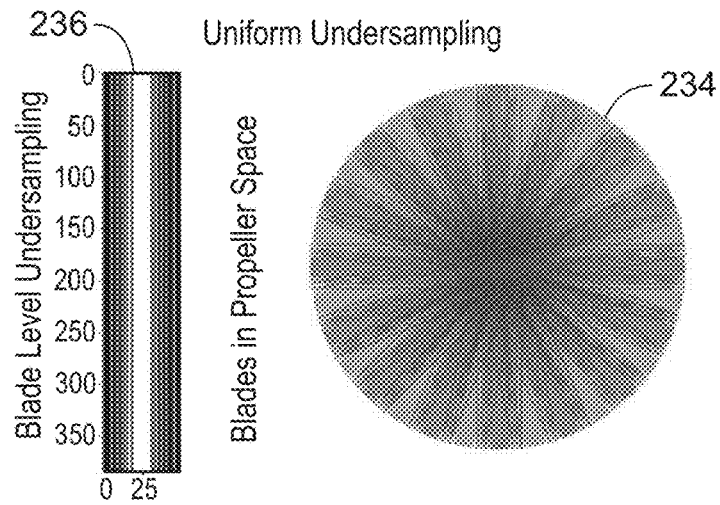
FIG. 8 illustrates an example of uniform undersampling a periodically rotated overlapping parallel lines with enhanced reconstruction (PROPELLER) acquisition, in accordance with aspects of the present disclosure.

Several approaches can be utilized to undersample the blades. FIG. 6 illustrates an example of a mask 228 of a fully sampled mask of a periodically rotated overlapping parallel lines with enhanced reconstruction (PROPELLER) acquisition. FIG. 7 illustrates an example of non-uniform undersampling a periodically rotated overlapping parallel lines with enhanced reconstruction (PROPELLER) acquisition. FIG. 7 depicts both a non-uniform undersampled mask 230 of a periodically rotated overlapping parallel lines with enhanced reconstruction (PROPELLER) acquisition and a blade 232 from the non-uniform unsampled PROPELLER data. FIG. 8 illustrates an example of uniform undersampling a periodically rotated overlapping parallel lines with enhanced reconstruction (PROPELLER) acquisition. FIG. 8 depicts both a uniform undersampled mask 234 of a periodically rotated overlapping parallel lines with enhanced reconstruction (PROPELLER) acquisition and a blade 236 from the uniform unsampled PROPELLER data.

Figure 9:
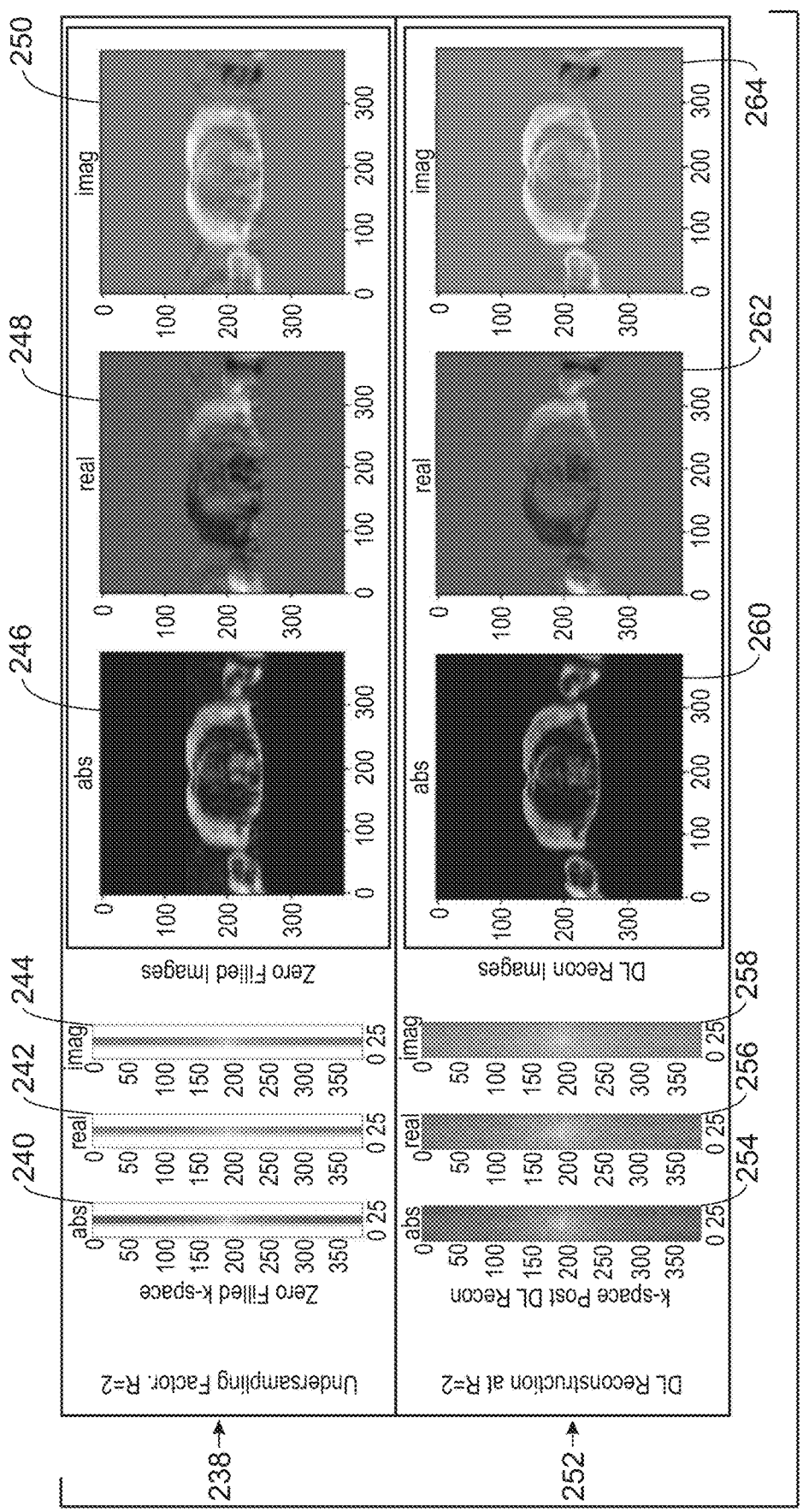
FIG. 9 depicts periodically rotated overlapping parallel lines with enhanced reconstruction (PROPELLER) images with zero filled image reconstruction and deep learning-based blade level reconstruction, of an abdomen of a subject in accordance with aspects of the present disclosure.

FIGS. 9-13 illustrate the effectiveness of performing deep learning-based blade level reconstruction. In particular, FIGS. 9-13 illustrate the effectiveness of performing deep learning-based blade level reconstruction for different parts of the anatomy (e.g., pelvis, abdomen, cervical spine, etc.). FIG. 9 depicts periodically rotated overlapping parallel lines with enhanced reconstruction (PROPELLER) images with zero filled image reconstruction and deep learning-based blade level reconstruction of an abdomen of a subject. A top row 238 of FIG. 9 depicts zero-filled k-space blade images from an accelerated periodically rotated overlapping parallel lines with enhanced reconstruction (PROPELLER) acquisition with an undersampling factor (or acceleration factor) of 2 and the corresponding zero filled reconstructed images. In particular, the top row 238 of FIG. 9 depicts a zero filled k-space magnitude blade image 240, a zero filled k-space real blade image 242, and a zero filled k-space imaginary blade image 244. The top row 238 of FIG. 9 also depicts the corresponding zero filled reconstructed magnitude image 246, zero filled reconstructed real image 248, and the zero filled reconstructed imaginary image 250. Zero filled image reconstruction has aliasing and blurring artifacts. A bottom row 252 of FIG. 9 depicts k-space blade images after deep-learning based blade-level reconstruction from an accelerated periodically rotated overlapping parallel lines with enhanced reconstruction (PROPELLER) acquisition with an undersampling factor (or acceleration factor) of 2 and the corresponding deep learning-based reconstructed images. In particular, the bottom row 252 of FIG. 9 depicts a deep learning-based reconstructed k-space magnitude blade image 254, a deep learning-based reconstructed k-space real blade image 256, and a deep learning-based reconstructed k-space imaginary blade image 258. The bottom row 252 of FIG. 9 also depicts the corresponding deep learning-based reconstructed magnitude image 260, deep learning-based reconstructed real image 262, and the deep learning-based reconstructed imaginary image 264. As depicted in FIG. 9, the image quality of the deep learning-based reconstructed images 260, 262, and 264 is better than the zero filled reconstructed images 246, 248, and 250. In particular, the zero filled reconstructed images 246, 248, and 250 have significant blurring and undersampling artifacts (e.g., streaks). The deep learning-based reconstructed images 260, 262, and 264 regain the sharpness and do not have the undersampling artifacts.

Figure 10:
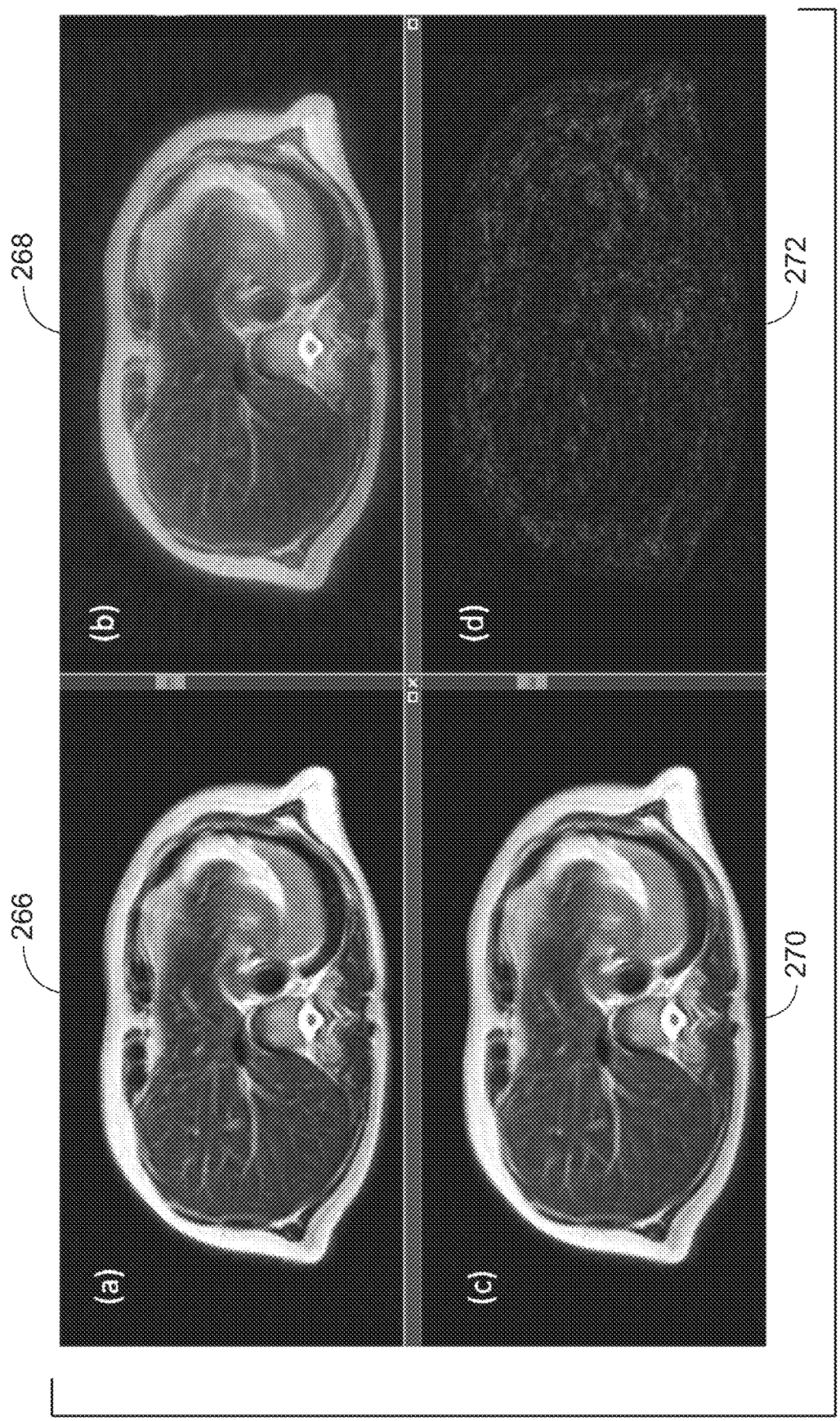
FIG. 10 depicts periodically rotated overlapping parallel lines with enhanced reconstruction (PROPELLER) images of an abdomen of a subject, in accordance with aspects of the present disclosure.

FIG. 10 depicts periodically rotated overlapping parallel lines with enhanced reconstruction (PROPELLER) images of an abdomen of a subject. Images were acquired of the abdomen of the subject with a 1.5 Tesla (T) magnetic resonance imaging scanner using a body coil. Image 266 is a fully sampled axial T2 respiratory triggered PROPELLER image of the abdomen of the subject. Image 268 is the corresponding zero filled axial T2 respiratory triggered PROPELLER image of the abdomen of the subject (with an undersampling factor or acceleration factor of 2). The same undersampling mask was used for all blades. Zero filled image reconstruction has aliasing and blurring artifacts. Image 270 is the deep learning-based reconstructed axial T2 respiratory triggered PROPELLER image of the abdomen of the subject utilizing the blade level reconstruction described in the method 180 in FIG. 2 (with the PROPELLER data acquired with an undersampling factor or acceleration factor of 2). Image 272 is the difference between the ground truth (i.e., fully sampled image 266) and the deep learning-based reconstructed image 270 at 4×. As depicted in FIG. 10, the image quality of the deep learning-based reconstructed image 270 is better than the zero filled reconstructed image 268. In particular, the zero filled reconstructed image 268 has significant blurring and undersampling artifacts (e.g., streaks). The deep learning-based reconstructed image 270 regains the sharpness and does not have the undersampling artifacts. The deep learning-based reconstructed image 270 has a similar image quality to the fully sampled image 266.

Figure 11:
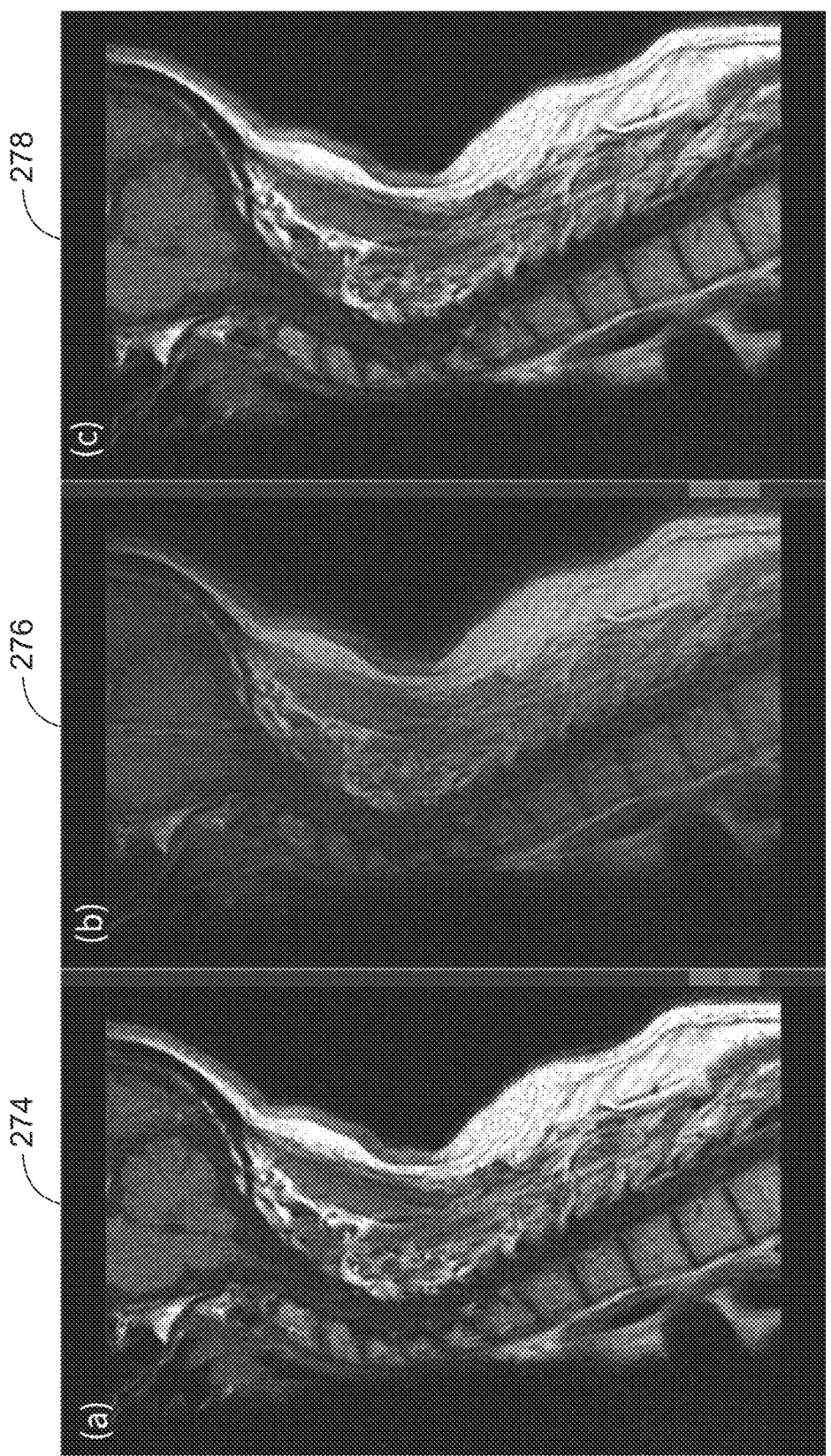
FIG. 11 depicts periodically rotated overlapping parallel lines with enhanced reconstruction (PROPELLER) images of a spine of a subject, in accordance with aspects of the present disclosure.

FIG. 11 depicts periodically rotated overlapping parallel lines with enhanced reconstruction (PROPELLER) images of a spine of a subject. Images were acquired of the spine of the subject with a 1.5 Tesla (T) magnetic resonance imaging scanner using a body coil. Image 274 is a fully sampled sagittal T1 PROPELLER image of the spine of the subject. Image 276 is the corresponding zero filled sagittal T1 PROPELLER image of the spine of the subject (with an undersampling factor or acceleration factor of 2). Zero filled image reconstruction has aliasing and blurring artifacts. Image 278 is the deep learning-based reconstructed sagittal T1 PROPELLER image of the spine of the subject utilizing the blade level reconstruction described in the method 180 in FIG. 2 (with the PROPELLER data acquired with an undersampling factor or acceleration factor of 2). As depicted in FIG. 11, the image quality of the deep learning-based reconstructed image 278 is better than the zero filled reconstructed image 276. In particular, the zero filled reconstructed image 276 has significant blurring and undersampling artifacts (e.g., streaks). The deep learning-based reconstructed image 278 regains the sharpness and does not have the undersampling artifacts. The deep learning-based reconstructed image 278 has a similar image quality to the fully sampled image 274.

Figure 12:
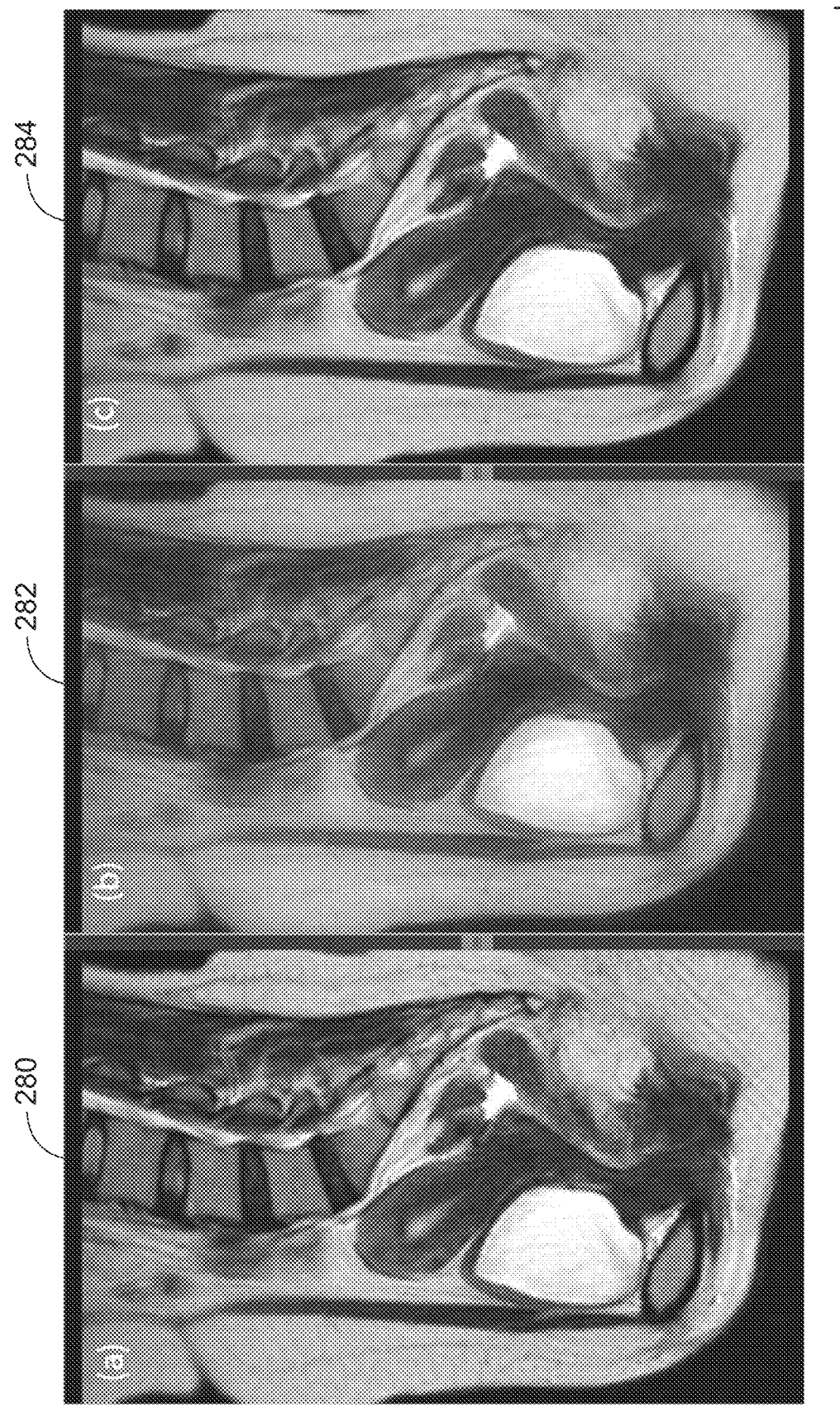
FIG. 12 depicts periodically rotated overlapping parallel lines with enhanced reconstruction (PROPELLER) images of a pelvis of a subject, in accordance with aspects of the present disclosure.

FIG. 12 depicts periodically rotated overlapping parallel lines with enhanced reconstruction (PROPELLER) images of a pelvis of a subject. Images were acquired of the pelvis of the subject with a 1.5 Tesla (T) magnetic resonance imaging scanner using a body coil. Image 280 is a fully sampled sagittal T2 PROPELLER image of the pelvis of the subject. Image 282 is the corresponding zero filled sagittal T2 PROPELLER image of the pelvis of the subject (with an undersampling factor or acceleration factor of 2). Zero filled image reconstruction has aliasing and blurring artifacts. Image 284 is the deep learning-based reconstructed sagittal T2 PROPELLER image of the pelvis of the subject utilizing the blade level reconstruction described in the method 180 in FIG. 2 (with the PROPELLER data acquired with an undersampling factor or acceleration factor of 2). As depicted in FIG. 12, the image quality of the deep learning-based reconstructed image 284 is better than the zero filled reconstructed image 282. In particular, the zero filled reconstructed image 282 has significant blurring and undersampling artifacts (e.g., streaks). The deep learning-based reconstructed image 284 regains the sharpness and does not have the undersampling artifacts. The deep learning-based reconstructed image 284 has a similar image quality to the fully sampled image 280.

Figure 13:
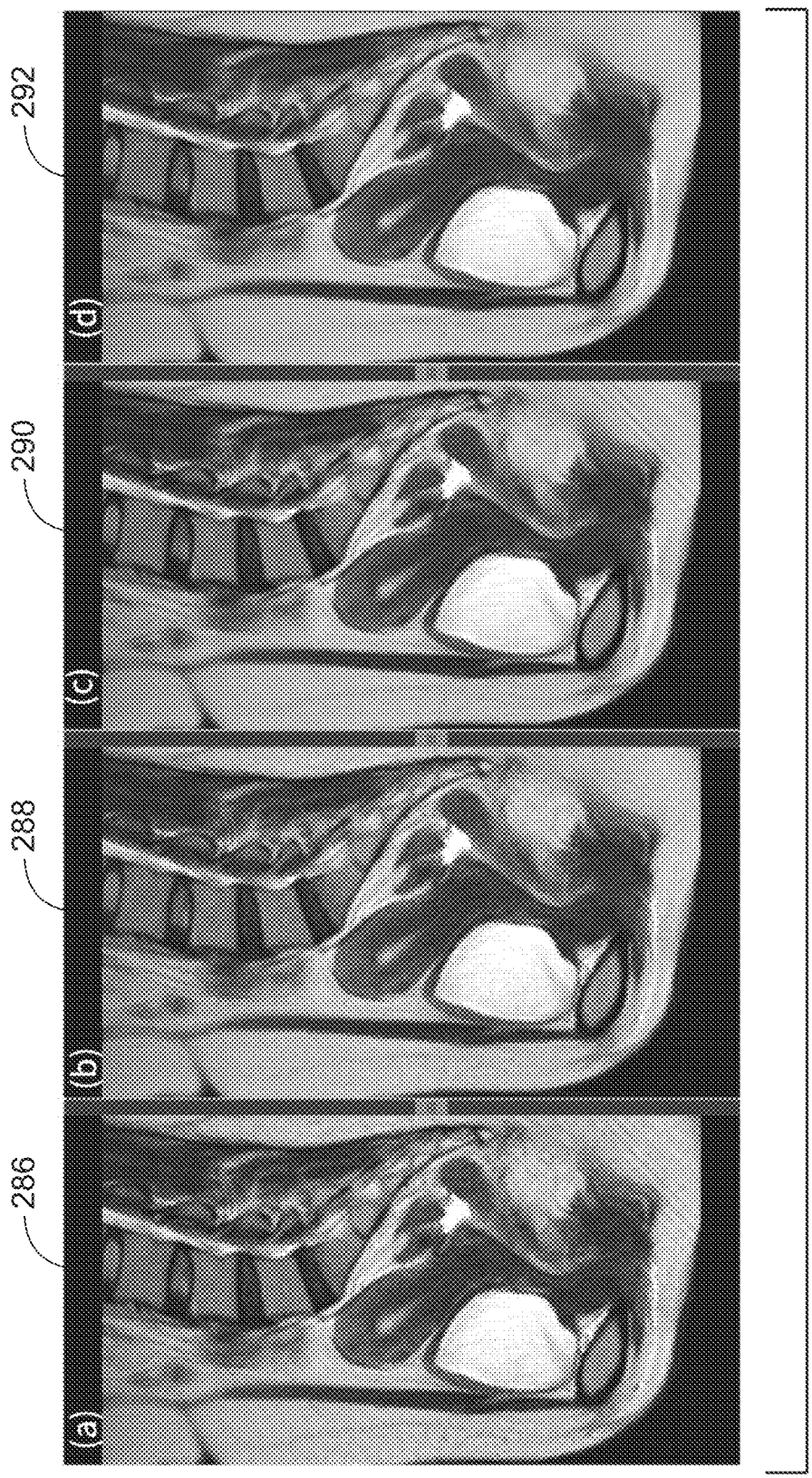
FIG. 13 depicts periodically rotated overlapping parallel lines with enhanced reconstruction (PROPELLER) images of a pelvis of a subject (e.g., depicting compatibility of artificial intelligence-based denoising with deep learning-based blade level reconstruction), in accordance with aspects of the present disclosure.

FIG. 13 depicts periodically rotated overlapping parallel lines with enhanced reconstruction (PROPELLER) images of a pelvis of a subject (e.g., depicting compatibility of artificial intelligence-based denoising with deep learning-based blade level reconstruction). Images were acquired of the pelvis of the subject with a 1.5 Tesla (T) magnetic resonance imaging scanner using a body coil. Image 286 is a fully sampled sagittal T2 PROPELLER image of the pelvis of the subject. Image 288 is the deep learning-based reconstructed sagittal T2 PROPELLER image of the pelvis of the subject utilizing the blade level reconstruction described in the method 180 in FIG. 2 (with the PROPELLER data acquired with an undersampling factor or acceleration factor of 2). Image 290 is the fully sampled image 286 after use of artificial intelligence-based denoising. Image 292 is the deep learning-based reconstructed image 288 after use of artificial intelligence-based denoising. The artificial-based denoising model or network was trained for PROPELLER images. Since the artificial-based denoising model or network was able to denoise the deep learning-based reconstructed image 288 it indicates that deep learning-based blade level reconstruction of accelerated data is not altering noise characteristics as learnt by the PROPELLER denoising model or network.

Technical effects of the disclosed subject matter include providing system and methods for reducing scan time of periodically rotated overlapping parallel lines with enhanced reconstruction (PROPELLER) imaging. In particular, technical effects of the disclosed subject matter include providing a technique that utilizes a Cartesian-like reconstruction approach at blade level for accelerated periodically rotated overlapping parallel lines with enhanced reconstruction (PROPELLER) acquisitions, while maintaining all of the remaining elements of the PROPELLER image reconstruction undisturbed in the reconstruction chain. Technical effects of the disclosed subject matter also includes enabling faster magnetic resonance imaging scans utilizing the periodically rotated overlapping parallel lines with enhanced reconstruction scans. Technical effects of the disclosed subject matter further includes increasing the system throughput for the use of the magnetic resonance imaging system. The disclosed subject matter may also be utilized with both Cartesian and PROPELLER undersampled reconstruction.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for reducing scan time of periodically rotated overlapping parallel lines with enhanced reconstruction (PROPELLER) imaging, comprising:
    acquiring, via a processor, in an accelerated manner a plurality of blades of k-space data of a region of interest in a rotational manner around a center of k-space via a magnetic resonance imaging (MRI) scanner during a PROPELLER sequence, wherein each blade of the plurality of blades of k-space data comprises a plurality of parallel phase encoding lines sampled in a phase encoding order, and wherein each blade of the plurality of blades of k-space data is undersampled;
    utilizing, via the processor, a deep learning-based reconstruction network to individually and separately reconstruct a fully sampled blade from each blade of the plurality of blades of k-space data;
    assembling, via the processor, all fully sampled blades together to form a plurality of fully sampled blades;
    utilizing, via the processor, a PROPELLER reconstruction algorithm to generate a complex image from the plurality of fully sampled blades.

2. The computer-implemented method of claim 1, wherein the deep learning-based reconstruction network is configured to perform with an arbitrary number of blades of k-space data.

3. The computer-implemented method of claim 1, wherein the plurality of blades of k-space data is acquired from a single receiver coil.

4. The computer-implemented method of claim 1, wherein the plurality of blades of k-space data is acquired from a plurality of receiver coils.

5. The computer-implemented method of claim 1, wherein the deep learning-based reconstruction network comprises an unrolled algorithm-based deep learning-based network.

6. The computer-implemented method of claim 5, further comprising training, via the processor, the deep learning-based reconstruction network on input-output data pairs utilizing supervised learning, wherein the input-output data pairs comprise undersampled k-space blade images and corresponding fully sampled k-space images acquired utilizing the PROPELLER sequence, and the undersampled k-space blade images were generated from the corresponding fully sampled k-space images.

7. The computer-implemented method of claim 1, wherein the plurality of blades of k-space data comprises skewed aspect ratios.

8. A system for reducing scan time of periodically rotated overlapping parallel lines with enhanced reconstruction (PROPELLER) imaging, comprising:
    a memory encoding processor-executable routines; and
    a processor configured to access the memory and to execute the processor-executable routines, wherein the processor-executable routines, when executed by the processor, cause the processor to:
        acquire, in accelerated manner, a plurality of blades of k-space data of a region of interest in a rotational manner around a center of k-space via a magnetic resonance imaging (MRI) scanner during a PROPELLER sequence, wherein each blade of the plurality of blades of k-space data comprises a plurality of parallel phase encoding lines sampled in a phase encoding order, and wherein each blade of the plurality of blades of k-space data is undersampled;
        utilize a deep learning-based reconstruction network to individually and separately reconstruct a fully sampled blade from each blade of the plurality of blades of k-space data;
        assemble all fully sampled blades together to form a plurality of fully sampled blades; and
        utilize a PROPELLER reconstruction algorithm to generate a complex image from the plurality of fully sampled blades.

9. The system of claim 8, wherein the deep learning-based reconstruction network is configured to perform with an arbitrary number of blades of k-space data.

10. The system of claim 8, wherein the plurality of blades of k-space data is acquired from a single receiver coil.

11. The system of claim 8, wherein the plurality of blades of k-space data is acquired from a plurality of receiver coils.

12. The system of claim 8, wherein the deep learning-based reconstruction network comprises an unrolled algorithm-based deep learning-based network.

13. The system of claim 12, wherein the processor-executable routines, when executed by the processor, further cause the processor to train the deep learning-based reconstruction network on input-output data pairs utilizing supervised learning, wherein the input-output data pairs comprise undersampled k-space blade images and corresponding fully sampled k-space images acquired utilizing the PROPELLER sequence, and the undersampled k-space blade images were generated from the corresponding fully sampled k-space images.

14. The system of claim 8, wherein the plurality of blades of k-space data comprises skewed aspect ratios.

15. A non-transitory computer-readable medium, the non-transitory computer-readable medium comprising processor-executable code that when executed by a processor, causes the processor to:
    acquire, in an accelerated manner, a plurality of blades of k-space data of a region of interest in a rotational manner around a center of k-space via a magnetic resonance imaging (MRI) scanner during a periodically rotated overlapping parallel lines with enhanced reconstruction (PROPELLER) sequence, wherein each blade of the plurality of blades of k-space data comprises a plurality of parallel phase encoding lines sampled in a phase encoding order, and wherein each blade of the plurality of blades of k-space data is undersampled;

utilize a deep learning-based reconstruction network to individually and separately reconstruct a fully sampled blade from each blade of the plurality of blades of k-space data;

assemble all fully sampled blades together to form a plurality of fully sampled blades; and utilize a PROPELLER reconstruction algorithm to generate a complex image from the plurality of fully sampled blades.

16. The non-transitory computer-readable medium of claim 15, wherein the deep learning-based reconstruction network is configured to perform with an arbitrary number of blades of k-space data.

17. The non-transitory computer-readable medium of claim 15, wherein the plurality of blades of k-space data is acquired from a single receiver coil.

18. The non-transitory computer-readable medium of claim 15, wherein the plurality of blades of k-space data is acquired from a plurality of receiver coils.

19. The non-transitory computer-readable medium of claim 15, wherein the deep learning-based reconstruction network comprises an unrolled algorithm-based deep learning-based network.

20. The non-transitory computer-readable medium of claim 15, wherein the processor-executable code, when executed by the processor, further causes the processor to train the deep learning-based reconstruction network on input-output data pairs utilizing supervised learning, wherein the input-output data pairs comprise undersampled k-space blade images and corresponding fully sampled k-space images acquired utilizing the PROPELLER sequence, and the undersampled k-space blade images were generated from the corresponding fully sampled k-space images.

* * * * *